H. R. DUNHAM.
Car Wheel.
No. 611.
2 Sheets—Sheet 1.
Patented Feb. 15, 1838.
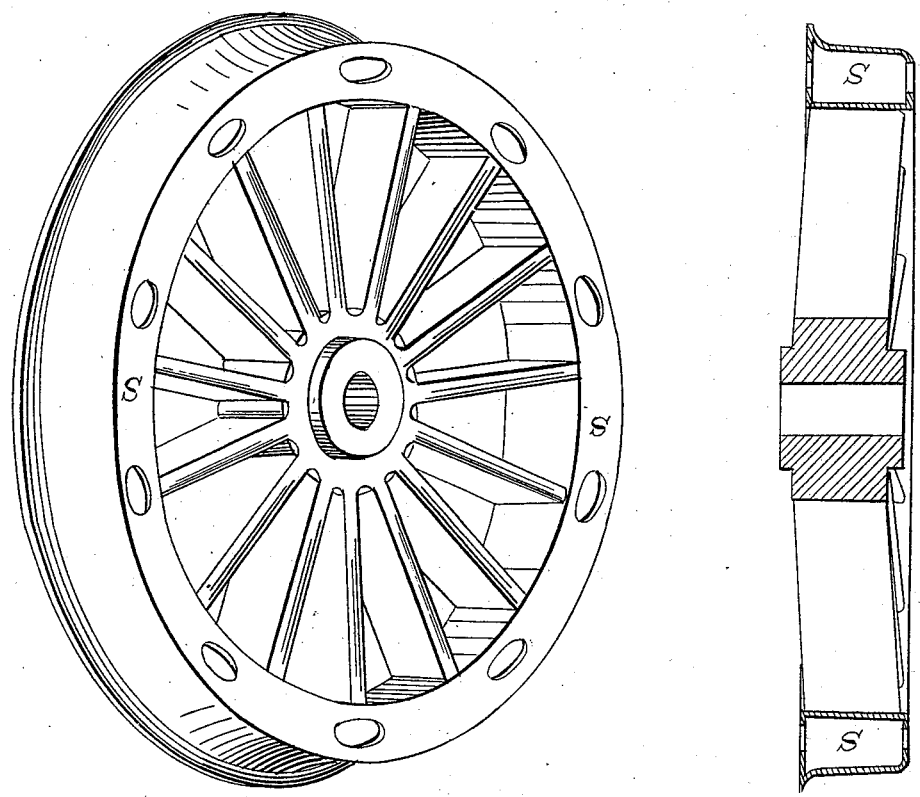

H. R. DUNHAM.
Car Wheel.
No. 611.
2 Sheets—Sheet 2.
Patented Feb. 15, 1838.
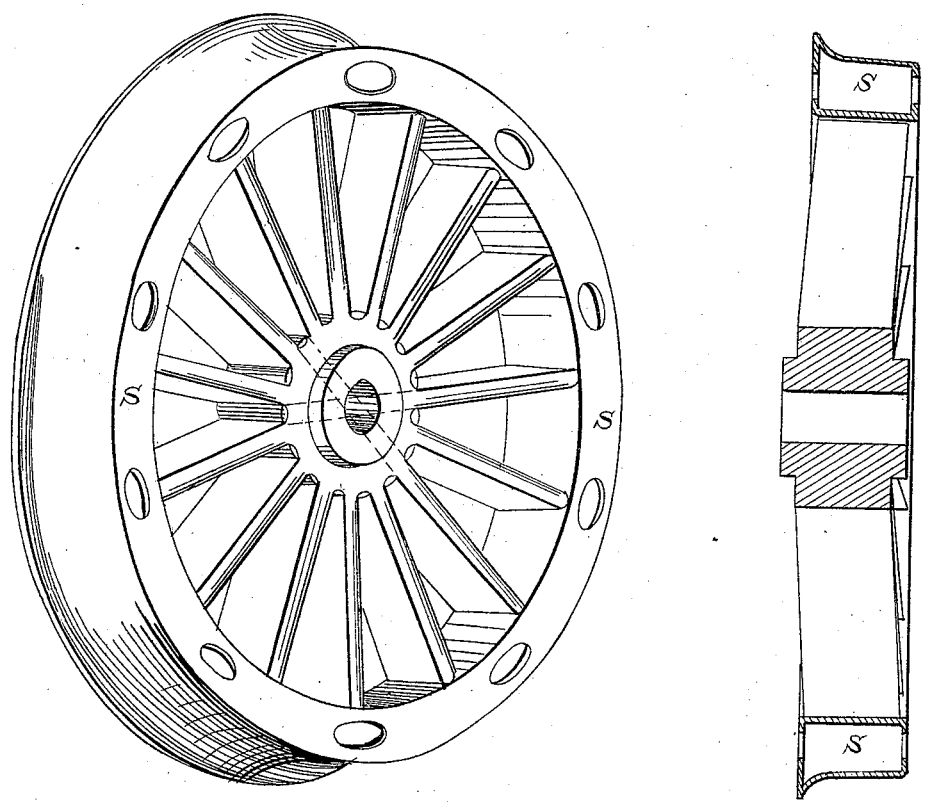

UNITED STATES PATENT OFFICE.

HENRY R. DUNHAM, OF NEW YORK, N. Y.

MAKING LOCOMOTIVE-ENGINE AND RAILROAD-CAR WHEELS.

Specification of Letters Patent No. 611, dated February 15, 1838.

*To all whom it may concern:*

Be it known that I, HENRY R. DUNHAM, of the city, county, and State of New York, engineer and machinist, have invented a new and useful Method or Improvement in Making Locomotive-Engine and Railroad-Car Wheels; and I do hereby declare that the following is a full and exact description thereof.

This wheel I cast in an iron mold and is properly called the chilled wheel from the fact of being hardened on the entire periphery caused by coming in contact with the iron mold at the time of casting it; but instead of continuing the arms of the wheel to the rim as is now the case and partly by annealing that section of the rim to which it extends I make two rims, the space between them being two inches, the same can be more or less and continue the arms of the wheel no farther than the inner rim, thereby leaving an uninterrupted space under the outer rim of two inches more or less; which gives to the outer or chilled rim an even temperatured or chilled surface (more durable and not liable to flatten opposite the arms obviating that difficulty in the wheels now in use) the outer rim being connected by the sides or edges to the inner rim, to which the arms of the wheel extend. The space between the inside and outside rim is made by the insertion of cores supported at intervals by cores in the usual manner.

What I claim as my invention or improvement and desire to secure by Letters Patent is—

The making of two rims, connected at the sides and leaving an uninterrupted space under the outside rim, excepting where it is joined at the edges or sides of the wheel and the said vacant uninterrupted space is represented by the drawing herewith sent, and is marked S, on said drawing extending entirely around the circumference of the wheel between the outer and inner rim in other words constituting a hollow felly cast in one hollow connected mass entirely around said wheel,—and the whole wheel it may further be remarked is cast in an entire casting.

In testimony whereof I the said HENRY R. DUNHAM, have hereunto subscribed my name in the presence of two witnesses whose names are also hereunto subscribed on this eighteenth day of November A. D. 1837.

HENRY DUNHAM.

Witnesses:
SAMUEL A. PORTER,
PHILANDER FISK.